US010489268B2

(12) United States Patent
Rao et al.

(10) Patent No.: US 10,489,268 B2
(45) Date of Patent: Nov. 26, 2019

(54) APPLICATION GRANULAR REPORTING

(71) Applicant: NetApp, Inc., Sunnyvale, CA (US)

(72) Inventors: Anureita Rao, San Jose, CA (US); Rupa Natarajan, Sunnyvale, CA (US); Srishylam Simharajan, Cranberry Township, PA (US)

(73) Assignee: NETAPP, INC., Sunnyvale, CA (US)

( * ) Notice: Subject to any disclaimer, the term of this patent is extended or adjusted under 35 U.S.C. 154(b) by 251 days.

(21) Appl. No.: 15/607,348

(22) Filed: May 26, 2017

(65) Prior Publication Data

US 2018/0341569 A1 Nov. 29, 2018

(51) Int. Cl.

| | |
|---|---|
| ***G06F 7/00*** | (2006.01) |
| ***G06F 17/00*** | (2019.01) |
| ***G06F 11/34*** | (2006.01) |
| ***G06F 11/36*** | (2006.01) |
| ***G06F 16/22*** | (2019.01) |

(52) U.S. Cl.

CPC ...... *G06F 11/3476* (2013.01); *G06F 11/3495* (2013.01); *G06F 11/3668* (2013.01); *G06F 16/22* (2019.01)

(58) Field of Classification Search

None

See application file for complete search history.

(56) References Cited

U.S. PATENT DOCUMENTS

| | | | | |
|---|---|---|---|---|
| 7,930,476 | B1 * | 4/2011 | Castelli | G06F 9/5016 709/225 |
| 8,082,330 | B1 * | 12/2011 | Castelli | G06F 9/5016 709/220 |
| 9,817,807 | B1 * | 11/2017 | Nagargadde | G06F 17/248 |
| 9,893,953 | B1 * | 2/2018 | Castelli | H04L 41/145 |
| 2005/0246397 | A1 | 11/2005 | Edwards et al. | |
| 2005/0246503 | A1 | 11/2005 | Fair | |
| 2008/0022012 | A1 * | 1/2008 | Wang | H04L 47/10 709/238 |
| 2013/0111034 | A1 | 5/2013 | Upadhya | |
| 2016/0012070 | A1 | 1/2016 | Aggarwal et al. | |
| 2016/0042090 | A1 * | 2/2016 | Mitkar | G06F 11/1448 707/649 |
| 2016/0154592 | A1 | 6/2016 | Goodman et al. | |

(Continued)

OTHER PUBLICATIONS

Non-Final Office Action on co-pending U.S. Appl. No. 15/786,682, dated Sep. 19, 2018.

(Continued)

*Primary Examiner* — Tuan A Pham

(74) *Attorney, Agent, or Firm* — Klein, O'Neill & Singh, LLP

(57) ABSTRACT

Presented herein are methods, non-transitory computer readable media, and devices providing an application centric view of storage within a network storage system, which include: creating an application instance, by the network storage system, wherein the application instance comprises at least one application-component determined based on application configuration information of the application instance; tracking the application configuration information of the application; and displaying the application configuration information in view of the storage within the network storage system.

17 Claims, 3 Drawing Sheets

124

300

Application Instance 310

Application Component 320(1)

Application Component 320(2)

Application Component 320(n)

Protocol Object 340

Storage Object 330

(56) References Cited

U.S. PATENT DOCUMENTS

| | | | |
|---|---|---|---|
| 2016/0246683 | A1 | 8/2016 | Vijayan et al. |
| 2018/0129821 | A1 | 5/2018 | Havewala et al. |

OTHER PUBLICATIONS

Non-Final Office Action on co-pending U.S. Appl. No. 15/607,340 dated Jan. 22, 2019.

Final Office Action on co-pending U.S. Appl. No. 15/786,682 dated Apr. 19, 2019.

Final Office Action on co-pending U.S. Appl. No. 15/607,340 dated Aug. 16, 2019.

* cited by examiner

APPLICATION GRANULAR REPORTING

TECHNICAL FIELD

The present disclosure relates generally to mass data storage networks and data storage filing systems. More particularly, aspects of this disclosure relate to methods, non-transitory computer readable media, and devices for providing an application centric view of storage by tracking which volumes and LUNs (logical unit numbers) belong to an application, which protocol endpoints are associated with the application and the expected service levels for each application component.

BACKGROUND

As data management applications become more advanced and complicated, the physical tracking of an application in a network storage system becomes increasingly difficult. Conventionally, once an application has been successfully provisioned by the administrator, there exists no convenient process to determine which storage components and protocol components are utilized by the application. For example, where a specified number of volumes and LUNs are designated to act as storage for an exemplary application, after provisioning the application, the network storage system does not provide which volumes, LUNs and igroups are in use by the application. An igroup is a logical named entity that is assigned to one or more addresses associated with one or more initiators. Typically, tracking the mapping between storage and application is the responsibility of the application administrator.

Because the network storage system does not track the mapping between the application and the storage components in use by that application, the network storage system cannot provide any application level reporting. Thus, the network storage system is unable to report how much storage capacity is in use by the application, or how many IOPS ("I/O operations per second") are being consumed by the application.

Figure 1:
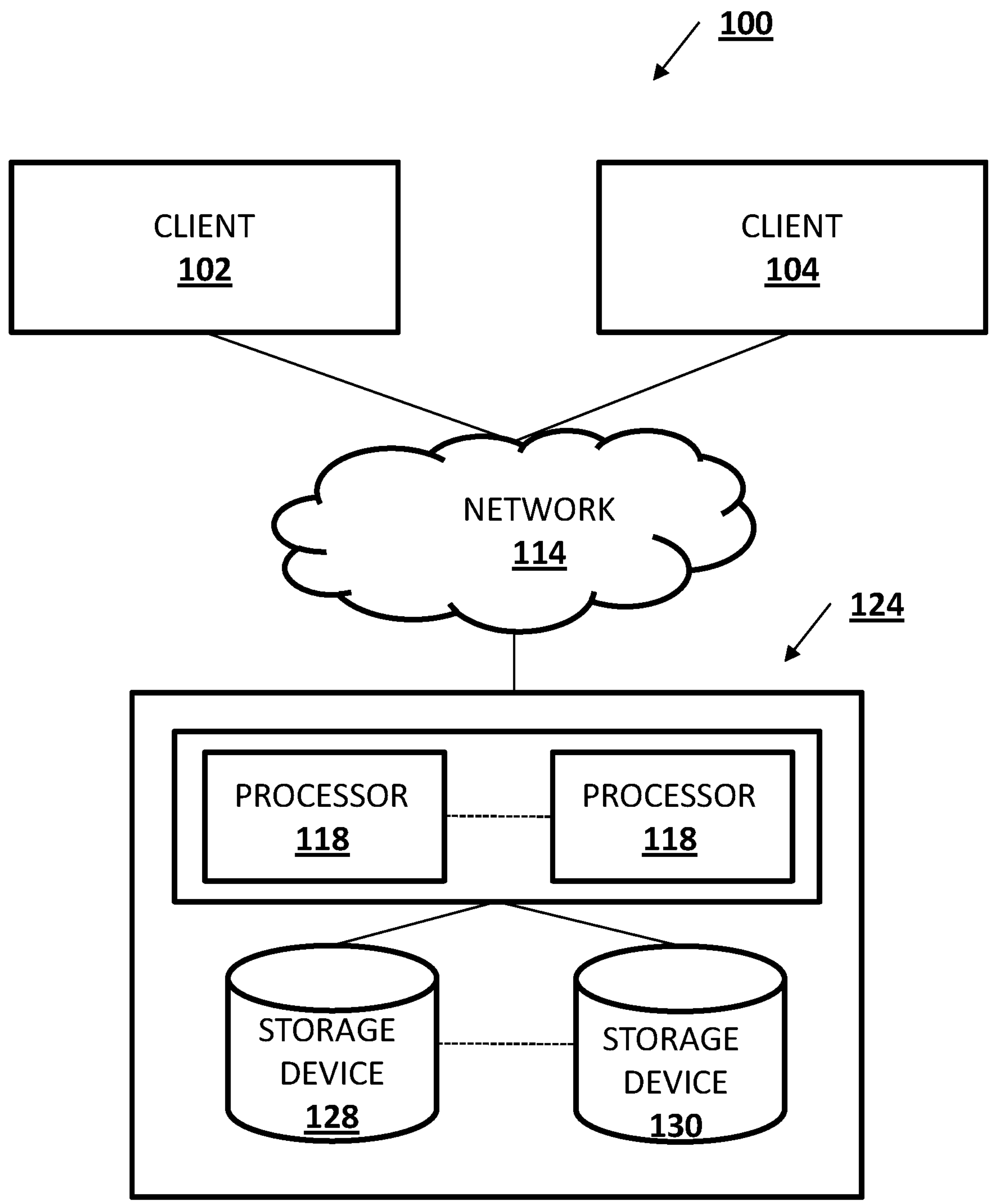
FIG. 1 exemplifies a schematic block diagram of a multiprocessor system in accordance with embodiments of the disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for providing an application centric view of storage. In exemplary embodiments, this is accomplished by tracking which volumes and LUNs (logical unit numbers) belong to an application, which protocol endpoints are associated with the application and the expected service levels for each application component. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage (NAS) environment, a storage area network (SAN), a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a Write Anywhere File Layout (WAFL®) file system.

It is desirable to provide an application-centric view of storage to an administrator, and one way to do so is by tracking which volumes and LUNs (logical unit numbers) belong to an application, which protocol endpoints are associated with the application and the expected service levels for each application component. Aspects of this disclosure are directed to methods, non-transitory computer readable media, and devices for creating a new object that an exemplary network storage system tracks and understands. In some embodiments, this object is called an application instance. The application instance is recognized within the exemplary network storage system much like a volume, aggregate or LUN.

Disclosed, for example, is a process for creating a first class management object in a network storage system, effectively titled application instance. The application instance is assigned a unique identifier by the network storage system. The network storage system also provides a set of interfaces that allow for an application instance to be provisioned and managed. In an exemplary embodiment of the disclosure, the set of interfaces includes a command line interpreter ("CLI") and Zephyr Application and Programming Interface (ZAPI) protocol. The application instance is made up of application components. The application components are discussed in more detail below. Each application component is in turn associated with one or more LUNs and/or volumes. For example, in some embodiments each application component can consist of one or more volumes. These volumes can be on different aggregates, and on different nodes. In other words, an application instance can span an entire node cluster. In order to report capacity and performance utilization for an application the relevant statistics from all the underlying storage objects that belong to this application is collected. In some embodiments, the RAID (redundant array of independent disks) label of each volume that belongs to an application is tagged with an application identifier and an application component identifier. This information can be used to determine which volumes belong to the same application for the purposes of aggregation. In this way, the administrator no longer deals in volumes, aggregates, LUNs, etc., to track the application. Rather, the administrator is able to track the application objects directly.

In exemplary embodiments of the disclosure, storage service classes (sSLCs) can be created for the application components to enable application management. In some embodiments, the service classes are used as an alternative to aggregates, performance polices, and the myriad of options/arguments/objects that are often found to be less user-friendly. In some embodiments of the disclosure, the new application object and information about the application components is stored in the network storage system. An object of the disclosure is to display the configuration of an application. This includes displaying the application components, the name of the template on which the application is based, the sizes and sSLCs of the components and protocol access information. This enables an administrator access to which storage objects are being used for that application (i.e. the list of volumes/LUNs etc.).

Referring now to the drawings, wherein like reference numerals refer to like features throughout the several views, there is shown in FIG. 1 a block diagram of an example of a network storage system 100, in accordance with some embodiments of the present disclosure. The network storage system 100 includes clients 102 and 104 and a server 124, which is a storage server in this example. The clients 102 and 104 can be computers or other processing systems capable of accessing the storage server 124 either directly or indirectly over a network 114. The clients 102 and 104 can access the storage server 124 over the network 114 using wireless or wired connections supporting one or more point-to-point links, shared local area networks (LAN), wide area networks (WAN), or other access technologies. The clients 102 and 104 can be accessing data, applications, raw storage, or various combinations thereof stored on the storage server 124.

In this example, the network storage system 100 is a type of storage system that provides storage services to clients 102 and 104 using, for example, storage area network (SAN), network-attached storage (NAS), or other storage technologies processed on multiple processors 118. However, it should be appreciated that alternate embodiments of the network storage system 100 can deliver other types of computer services on a multiprocessor platform. For example, the storage server 124 can include web server technologies that deliver web pages and web services to the clients 102 and 104 over the Internet. In other embodiments, the storage server 124 can include other general purpose applications that can deliver various functionalities or data to the clients 102 and 104.

The storage server 124 is configured to operate according to a client/server model of information delivery thereby allowing multiple clients 102 and 104 to access files or other data simultaneously. In this model, the client 102 or 104 can be a computer running an application, such as a file-system protocol. Each client 102 or 104 can request the services of the storage server 124 by issuing storage-system protocol messages. For example, the clients 102 and 104 can request to either read data from or write data to the storage server 124.

In the example of FIG. 1, the storage server 124 is a file-level server, such as a server used in a NAS environment, a block-level storage server used in a SAN environment, or other storage systems capable of providing both file-level and block-level service. For example, the storage server 124 can use a combination of software and hardware to provide storage services including the organization of information on storage devices 128 and 130, such as disks. The storage server 124 includes a file system to organize logically the information as a hierarchical or other structure of directories and files on the disks 128 and 130.

Although the storage server 124 is illustrated as a single unit in FIG. 1, it can also be implemented in a distributed architecture. For example, the storage server 124 can be implemented with multiple distributed storage servers (not shown). Additionally, the storage server 124 can also include a physically separate network module and disk module (not shown), which communicate with other storage servers over an external interconnect. The network module functions as a front-end of the storage server 124, exporting services to the clients 102 and 104. The disk module functions as the back-end, managing and implementing a parity declustered distribution of a Redundant Array of Independent Disks (RAID) organization on the underlying storage of the storage server 124.

Figure 2:
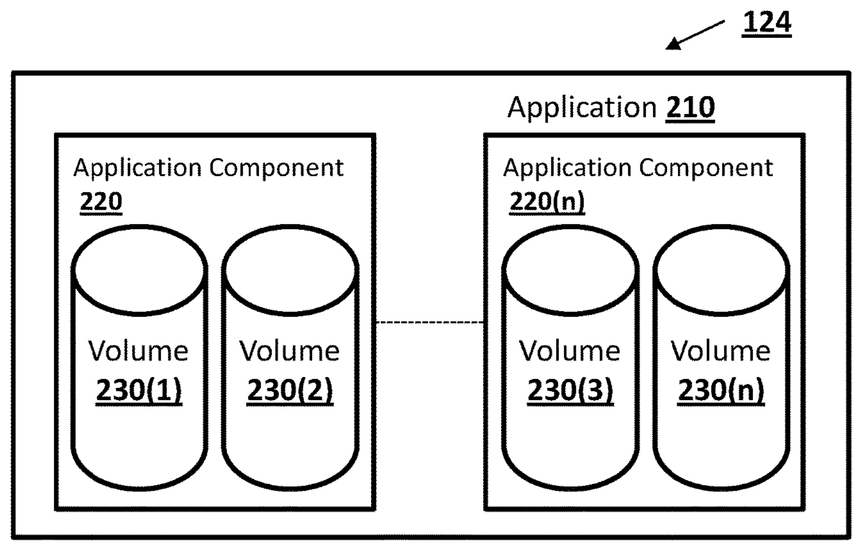
FIG. 2 is a schematic block diagram of the storage server in accordance with some embodiments of the disclosure

FIG. 2 is a schematic block diagram of the storage server in accordance with some embodiments of the disclosure. The storage server 124 includes an application 210. An application consists of a primary copy and its replicas. The relationship between the copies is called protection topology or just topology. Each copy is called an application instance and has its own performance and space requirements. The application 210 can include application components 220(*n*). Each application component 220(*n*) can include one or more volumes 230(*n*). These volumes can be on different storage aggregates, and on different nodes. In other words, an application instance can span a network storage system cluster. In order to report capacity and performance utilization for an application, the relevant statistics are collected from all the underlying storage objects that belong to this application (across different nodes in the cluster) and aggregate the data. This is discussed in detail with regards to FIG. 3.

In some embodiments, an application instance is a copy of the application storage in a specified cluster. Furthermore, an application instance is a collection of items with different performance, space and local protection requirements, with all the items servicing the same application or virtual memory. In some embodiments, an application consists of one or more volumes depending on performance, space and local protection requirements. In some embodiments, storage items with different performance, space, local protection requirements go into different volumes.

Figure 3:
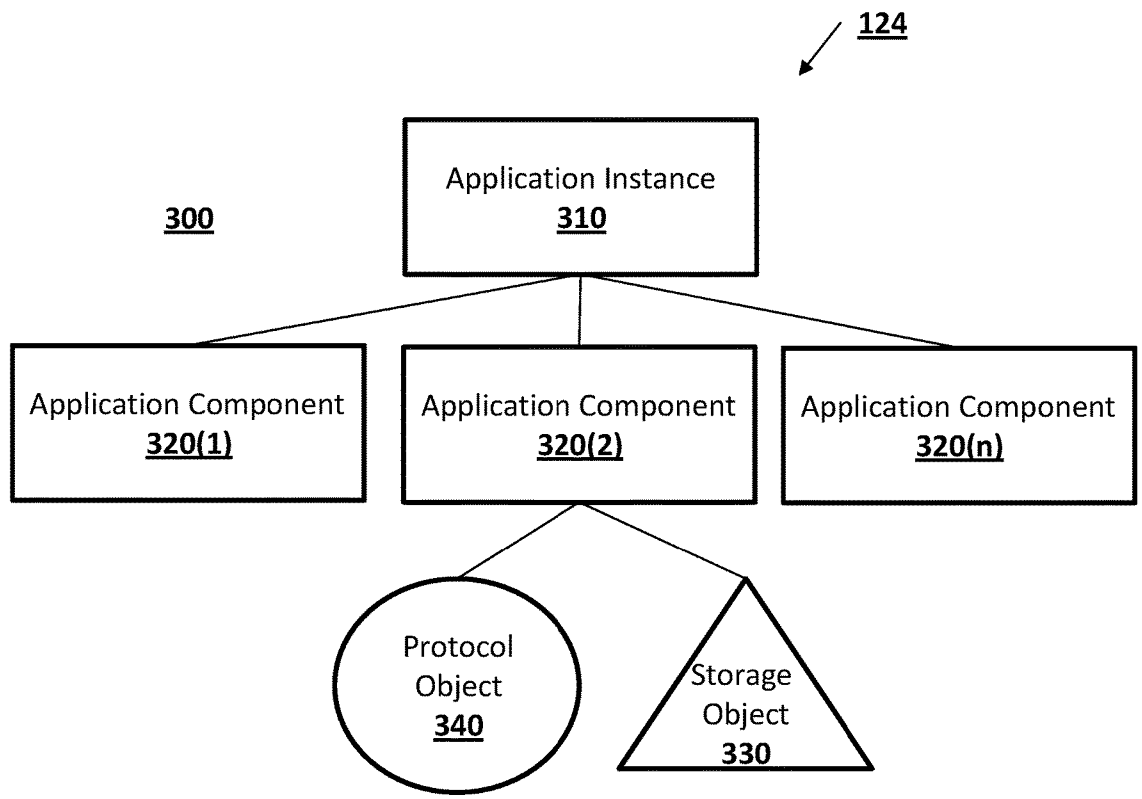
FIG. 3 is a schematic block diagram of an application model stored within the storage server in accordance with embodiments of the disclosure.

FIG. 3 is a schematic block diagram of an application model 300 stored within the storage server 124 that can be advantageously used with the present disclosure. As an initial matter, an application instance 310 is created. First, a set of parameters that collectively describe the configuration of a potential or actual application are determined. The set of parameters represent the characteristics of the application. This can include database sizes, service levels, protocol access elements such as logical interfaces (LIFs) that an application administrator can specify in order to provision storage on a network storage system. The set of parameters also represent a fine granular representation of the network storage system entities. This can include LUNs and volumes with their respective sizes and service levels, and LIFs. The fine granular representation of the network storage system entities detail how the application administrator's high level specifications translate to the peculiarities of the storage system. The application has a unique application-name. Its configuration follows the model described in one of the application-templates, and includes at least one application-component 320.

An application-component 320 is a set of storage elements—volumes and/or LUNs—used to store the data associated with that application, and other characteristics. The application-component 320 can store characteristics such as the application capacity, storage-service levels, protection service levels and related properties. In addition, each application-component 320 can also have associated protocol access elements, such as initiator-groups, portsets or export-policies.

As shown in FIG. 3, an application instance 310 can include multiple application components 320. In some embodiments, an application can have anywhere between 1 and 10 application-components 320. For simplicity purposes, the application instance 310 in the illustrated embodiment includes 3 application-components 320. However, one of ordinary skill in the art would understand any number of application-components can be implemented herein. The application-component 320 can include a group of LUNs (for a SAN application) or volumes (for a NAS application). The application-components 320 can each point to a storage object 330 or protocol object 340. The storage objects 330 can include a LUN, volume or aggregate. In some embodiments, the constituents of an application-component 320 can differ based on the protocol—SAN, Network File System (NFS), Common Internet File System (CIFS)—used to access the application. For example, in some embodiments, an application-component 320 of a SAN application consists of 1 or more LUNs, spread across 1 or more volumes, whereas an application component of a NFS or CiFS application can consist of 1 or more volumes. In some embodiments, a single application-component is associated with a single storage-service level. In alternative embodiments, some applications with multiple application-components can simplify this further by exposing a single storage-service level for all the application-components of that application.

The protocol access elements of an application can be specified. An application-component 320 can also have one or more initiator groups if it is a SAN application-component, and associated list of initiators and portsets. Alternatively, in some embodiments, an application component 320 can have an export-policy and access-permissions if it is a NFS or CiFS application-component. The LUNs within the application-component 320 of a SAN application can be accessed by the set of initiators specified in the initiator-groups (igroups) associated with that application-component 320. Every igroup has a list of initiators associated with it, with 1 or more initiator WWPNs (World Wide Port Name) if accessed through Fibre-Channel protocol, or IP addresses if accessed using the iSCSI protocol. In addition, the user can also be required to specify the igroup-os-type.

The LUNs of an application-component 320 are mapped to the set of igroups associated with it by default. While an application-component 320 could have more than 1 such igroup associated with it, the typical application-component 320 is associated with a single igroup. Individual application templates can simplify that further by associating all the application-components of an application with a common set of or even a single igroup. The user can choose to use one or more existing igroups with an application-component or create one or more new igroups each with a set of initiators. Typically an application-component 320 is associated with a single igroup. However, in some embodiments of the disclosure, certain applications can support multiple igroups per application-component 320. Some applications with multiple application-components 320 can simplify this further by exposing a single igroup for all the application-components 320 of that application. Furthermore, the input/output operations per second (IOPs) consumed and the capacity utilized of the application is collected. In some embodiments of the disclosure, the TOPS for each application component can be collected and displayed to the administrator. In alternative embodiments of the disclosure, the TOPS application wide can be collected and displayed to the administrator.

Metadata related to one or more RAID groups (i.e., RAID-related metadata) is stored as a RAID label on each storage device, e.g., hard disk drive (HDD) and/or solid state drive (SSD), of the storage server 124. The RAID label is typically organized as a topology tree structure that identifies, inter alia, a RAID group (i.e., a logical grouping within an aggregate operated cooperatively) to which the storage device belongs, as well as a generation count of the storage device. In some embodiments of the disclosure, the RAID label of each volume that belongs to an application is tagged with an application identifier and an application component identifier. This information is used to identify which volumes belong to the same application for the purposes of aggregation. In some embodiments, the capacity and performance counts across the application can be summed to create combination objects or 'combo objects'.

Thus, by utilizing the application-components 320 of the application instance 310, the administrator is able to track which volumes and LUNs belong to a particular application, which protocol endpoints are associated with the application and other relevant protocol configuration protocol configuration information (like igroups and export policies), and the expected service levels for each application component. In this way, the administrator is able to readily view the application configuration information.

Figure 4:
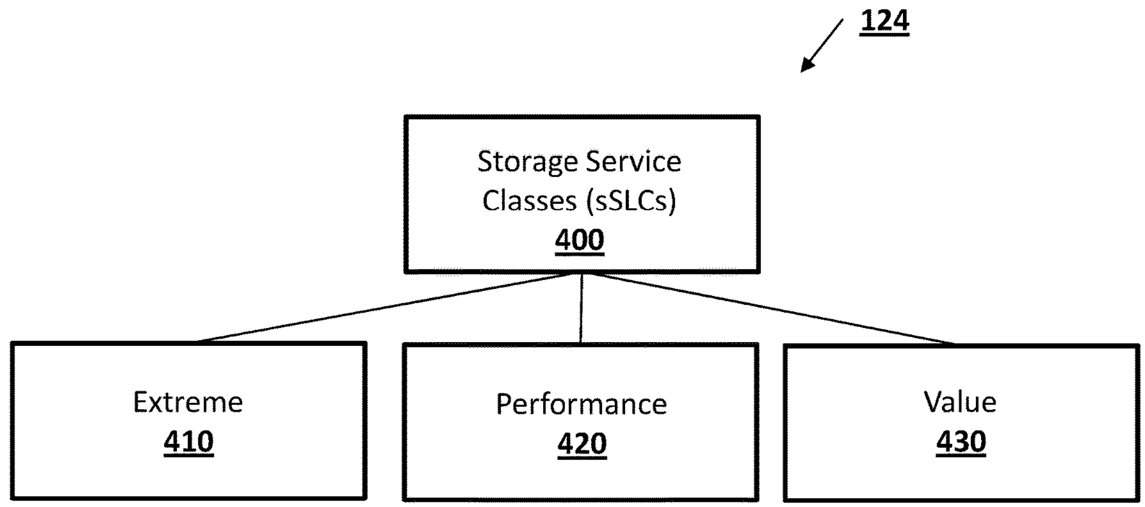
FIG. 4 is a schematic block diagram of a service level class model stored within the storage server in accordance with embodiments of the disclosure.

FIG. 4 is a schematic block diagram of a service level class model 400 stored within the storage server 124 that can be advantageously used with the present disclosure. Storage service classes (sSLCs) 400 are provided to simplify the application management tools of an administrator. In exemplary embodiments of the disclosure, the sSLCs can include Extreme 410, Performance 420 and Value 430. It should be understood that more or less sSLCs can be implemented in the present disclosure. These are offered as alternatives to aggregates, performance polices, and the myriad of options/arguments/objects often found to be burdensome to manage. Each service class can be constructed such that the level of service is associated with pre-specified specifications of the storage server 124. For example, selecting storage service level "Extreme" can identify a specific aggregate, create a volume within the aggregate, and set a QoS policy on the volume configured under pre-designated parameters of the storage service level. This is the same for Performance 420 and Value 430. Each of the sSLCs 400 can include pre-designated parameters that are compatible for the intended application to be provisioned.

Figure 5:
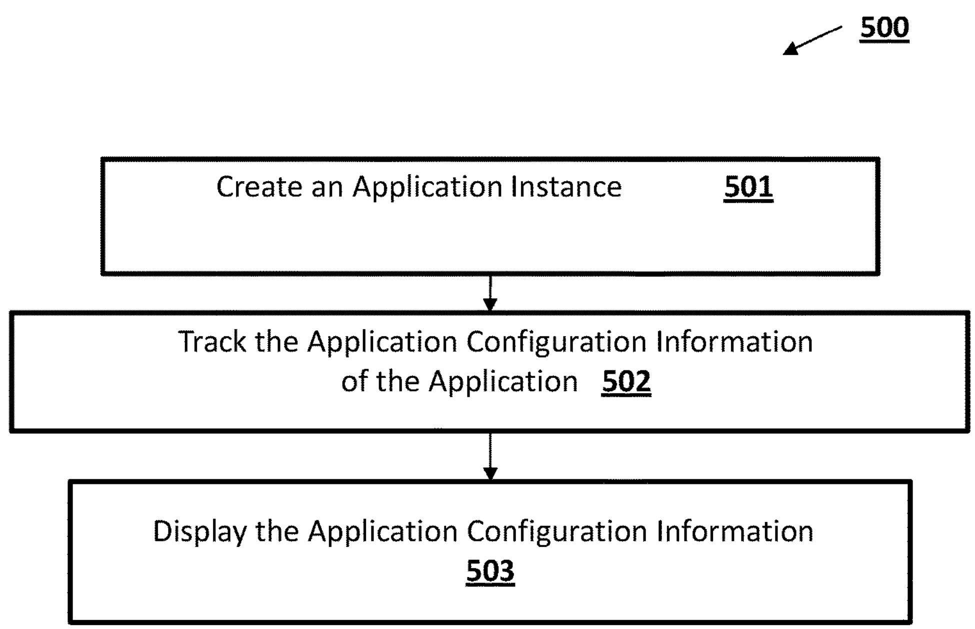
FIG. 5 illustrates a process flow diagram of a method for providing an application centric view of storage within a network storage system in accordance with an exemplary embodiment of the disclosure.

FIG. 5 illustrates a process flow diagram of a method for providing an application centric view of storage within a network storage system, indicated by general reference character 500. The process 500 commences at step 501 where an application instance is created. First, a set of parameters that collectively describe the configuration of a potential or actual application is determined. The set of parameters represent the characteristics of the application. This can include database sizes, service levels, protocol access elements such as logical interfaces (LIFs) that an application administrator can specify in order to provision storage on a network storage system. The set of parameters also represent a fine granular representation of the network storage system entities. This can include LUNs and volumes with their respective sizes and service levels, and LIFs. The fine granular representation of the network storage system entities detail how the application administrator's high level specifications translate to the peculiarities of the storage system. An application has a unique application-name. Its configuration follows the model described in one of the application-templates, and includes at least one application-component.

At step 502, the application configuration information of the application is tracked. For example, the volumes and LUNs that belong to the application are tracked. Furthermore, the protocol endpoints associated with the application and other protocol configuration information are tracked. Finally, the expected service levels for each application component are tracked. This is described in detail with respect to FIG. 2 above.

At step 503, the application configuration information is displayed to an administrator. Thus, the process flow diagram 500 enables an administrator access to which storage objects are being used for that application (i.e. the list of volumes/LUNs etc.).

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, comprising:

creating by a processor of a networked storage system, an application instance for an application storing data at the networked storage system, wherein the application instance is represented by a management object that comprises an application-component that is based on application configuration information of the application instance, the application configuration information represented by a set of parameters indicating a plurality of characteristics of the application;

wherein the management object points to a storage object used by the networked storage system to store data for the application and a protocol object that identifies a protocol specific parameter used by the application to store and retrieve data from the networked storage system;

wherein the application-component comprises associated protocol access elements, including an initiator-group, a port set and an export policy;

using the management object by the processor, for tracking the application configuration information of the application instance; and providing access to information regarding the storage object and the protocol object by the processor from the application instance for an application centric view of storage within the network storage system.

2. The method of claim 1, wherein the application-component comprises a set of storage elements used to store data associated with the application instance.

3. The method of claim 1, wherein the application-component comprises at least one characteristic of the application instance, including application capacity, storage-service level, and protection service level.

4. The method of claim 1, wherein tracking the application configuration information of the application comprises using the storage object for tracking volumes and LUNs (logical unit numbers) that belong to the application.

5. The method of claim 1, wherein tracking the application configuration information of the application comprises using the protocol object for tracking protocol endpoints that are associated with the application.

6. The method of claim 1, wherein tracking the application configuration information of the application comprises tracking an expected service level for the application component.

7. A non-transitory machine-readable medium having stored thereon instructions for performing a method comprising machine executable code which when executed by at least one machine, causes the machine to:

create an application instance for an application storing data at a networked storage system, wherein the application instance is represented by a management object that comprises an application-component that is based on application configuration information of the application instance, the application configuration information represented by a set of parameters indicating a plurality of characteristics of the application;

wherein the management object points to a storage object used by the networked storage system to store data for the application and a protocol object that identifies a protocol specific parameter used by the application to store and retrieve data from the networked storage system;

wherein the application-component comprises associated protocol access elements, including an initiator-group, a port set and an export policy;

use the management object to track the application configuration information of the application instance; and provide access to information regarding the storage object and the protocol object by from the application instance for an application centric view of storage within the network storage system.

8. The non-transitory computer readable medium of claim 7, wherein the application-component comprises a set of storage elements used to store data associated with the application instance.

9. The non-transitory computer readable medium of claim 7, the application-component comprises at least one characteristic of the application instance, including application capacity, storage-service level, and protection service level.

10. The non-transitory computer readable medium of claim 7, wherein tracking the application configuration information of the application comprises using the storage object for tracking volumes and LUNs (logical unit numbers) that belong to the application.

11. The non-transitory computer readable medium of claim 7, wherein tracking the application configuration information of the application comprises using the protocol object for tracking protocol endpoints that are associated with the application.

12. The non-transitory computer readable medium of claim 7, wherein tracking the application configuration information of the application comprises tracking an expected service level for the application component.

13. A computing device, comprising:

a memory containing machine readable medium comprising machine executable code having stored thereon instructions for providing an application centric view of storage within a network storage system;

a processor coupled to the memory, the processor configured to execute the machine executable code to cause the processor to:

create an application instance for an application storing data at a networked storage system, wherein the application instance is represented by a management object that comprises an application-component that is based on application configuration information of the application instance, the application configuration information represented by a set of parameters indicating a plurality of characteristics of the application;

wherein the management object points to a storage object used by the networked storage system to store data for the application and a protocol object that identifies a protocol specific parameter used by the application to store and retrieve data from the networked storage system;

wherein the application-component comprises associated protocol access elements, including an initiator-group, a port set and an export policy;

use the management object to track the application configuration information of the application instance; and provide access to information regarding the storage object and the protocol object by from the application instance for an application centric view of storage within the network storage system.

14. The computing device of claim 13, wherein the application-component comprises a set of storage elements used to store data associated with the application instance.

15. The computing device of claim 13, the application-component comprises at least one characteristic of the application instance, including application capacity, storage-service level, and protection service level.

16. The computing device of claim 13, wherein tracking the application configuration information of the application comprises using the storage object for tracking volumes and LUNs (logical unit numbers) that belong to the application.

17. The computing device of claim 13, wherein tracking the application configuration information of the application comprises using the protocol object for tracking protocol endpoints that are associated with the application.

* * * * *